(12) United States Patent
Chennupaty et al.

(10) Patent No.: US 6,275,904 B1
(45) Date of Patent: *Aug. 14, 2001

(54) CACHE POLLUTION AVOIDANCE INSTRUCTIONS

(75) Inventors: Srinivas Chennupaty; Shreekant S. Thakkar; Thomas Huff, all of Portland, OR (US); Vladimir Pentkovski, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,385

(22) Filed: Mar. 31, 1998

(51) Int. Cl.[7] ................................................ G06F 12/08
(52) U.S. Cl. ................................ 711/138; 711/122
(58) Field of Search ............................. 711/113, 118, 711/122, 138

(56) References Cited

U.S. PATENT DOCUMENTS

| 5,586,296 | * | 12/1996 | Bernstein et al. | 711/138 |
| 5,890,216 | * | 3/1999 | Derrick et al. | 711/138 |
| 6,021,470 | * | 2/2000 | Frank et al. | 711/138 |

FOREIGN PATENT DOCUMENTS

| 0 779 581 A | 6/1997 | (EP) . |
| 2 228 116 A | 8/1990 | (GB) . |
| 2 271 653 A | 4/1994 | (GB) . |

OTHER PUBLICATIONS

The UltraSPARC Processor—Technology White Paper, The UltraSPARC Architecture, Sun Microsystems, Jul. 17, 1997, p. 1–10.

21164 Alpha Microprocessor Data Sheet, Samsung Electronics, 1997.

Visual Instruction Set (VIS™) User's Guide, Sun Microsystems, Version 1.1, Mar. 1997.

AMD–3D Technology Manual, AMD, Publication No. 21928, Issued Date: Feb. 1998.

* cited by examiner

*Primary Examiner*—Hiep T. Nguyen
(74) *Attorney, Agent, or Firm*—Blakely, Sokoloff, Taylor & Zafman LLP (57) ABSTRACT

A computer system and method for providing cache memory management. The computer system comprises a main memory having a plurality of main memory addresses each having a corresponding data entry, and a processor coupled to the main memory. At least one cache memory is coupled to the processor. The at least one cache memory has a cache directory with a plurality of addresses and a cache controller having a plurality of data entries corresponding to the plurality of addresses. The processor receives an instruction having an operand address and determines if the operand address matches one of the plurality of addresses in the cache directory. If so, the processor updates a data entry in the cache controller corresponding to the matched address. Otherwise, a data entry corresponding to the operand address in the main memory is updated.

18 Claims, 5 Drawing Sheets

CACHE POLLUTION AVOIDANCE INSTRUCTIONS

BACKGROUND OF THE INVENTION

1. Field of the Invention

The present invention relates in general to the field of computer systems, and in particular, to an apparatus and method for providing instructions which facilitate the control of cache accesses while minimizing cache pollution.

2. Description of the Related Art

The use of a cache memory with a processor facilitates the reduction of memory access time. The fundamental idea of cache organization is that by keeping the most frequently accessed instructions and data in the fast cache memory, the average memory access time will approach the access time of the cache. To achieve the optimal tradeoffs between cache size and performance, typical processors implement a cache hierarchy, that is, different levels of cache memory. The different levels of cache correspond to different distances from the processor core. The closer the cache is to the processor, the faster the data access. However, the closer the cache is to the processor, the more costly it is to implement. As a result, the closer the cache level, the faster and smaller the cache.

The performance of cache memory is frequently measured in terms of its hit ratio. When the processor refers to memory and finds the data in its cache, it is said to produce a hit. If the data is not found in cache, then it is in main memory and is counted as a miss. If a miss occurs, then an allocation is made at the entry indexed by the address of the access. The access can be for loading data to the processor or storing data from the processor to memory. The cached information is retained by the cache memory until it is no longer needed, made invalid or replaced by other data, in which instances the cache entry is de-allocated.

A computer system may utilize one or more levels of cache memory. Allocation and de-allocation schemes implemented for the cache for various known computer systems are generally similar in practice. General practice has been to allocate an entry in the cache for all accesses required by the processor. Accordingly, system architectures specify re-use of accessed data without notion of relevant cache hierarchy level. That is, all accesses are allocated in cache. A disadvantage of this approach is that in certain instances, certain data is referenced once and not reused in the immediate future. It is not desirable for such data, typically termed as non-temporal data, to overwrite data that is used frequently (i.e., temporal data) such as application-cached code and data, when cache memory is full.

BRIEF SUMMARY OF THE INVENTION

A computer system and method for providing cache memory management is disclosed. The computer system comprises a main memory having a plurality of main memory addresses each having a corresponding data entry, and a processor coupled to the main memory. At least one cache memory is coupled to the processor. The at least one cache memory has a cache directory with a plurality of addresses and a cache controller having a plurality of data entries corresponding to the plurality of addresses. The processor receives an instruction having an operand address and determines if the operand address matches one of the plurality of addresses in the cache directory. If so, the processor updates a data entry in the cache controller corresponding to the matched address. Otherwise, a data entry corresponding to the operand address in the main memory is updated.

BRIEF DESCRIPTION OF THE DRAWINGS

The invention is illustrated by way of example, and not limitation, in the figures. Like reference indicate similar elements.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
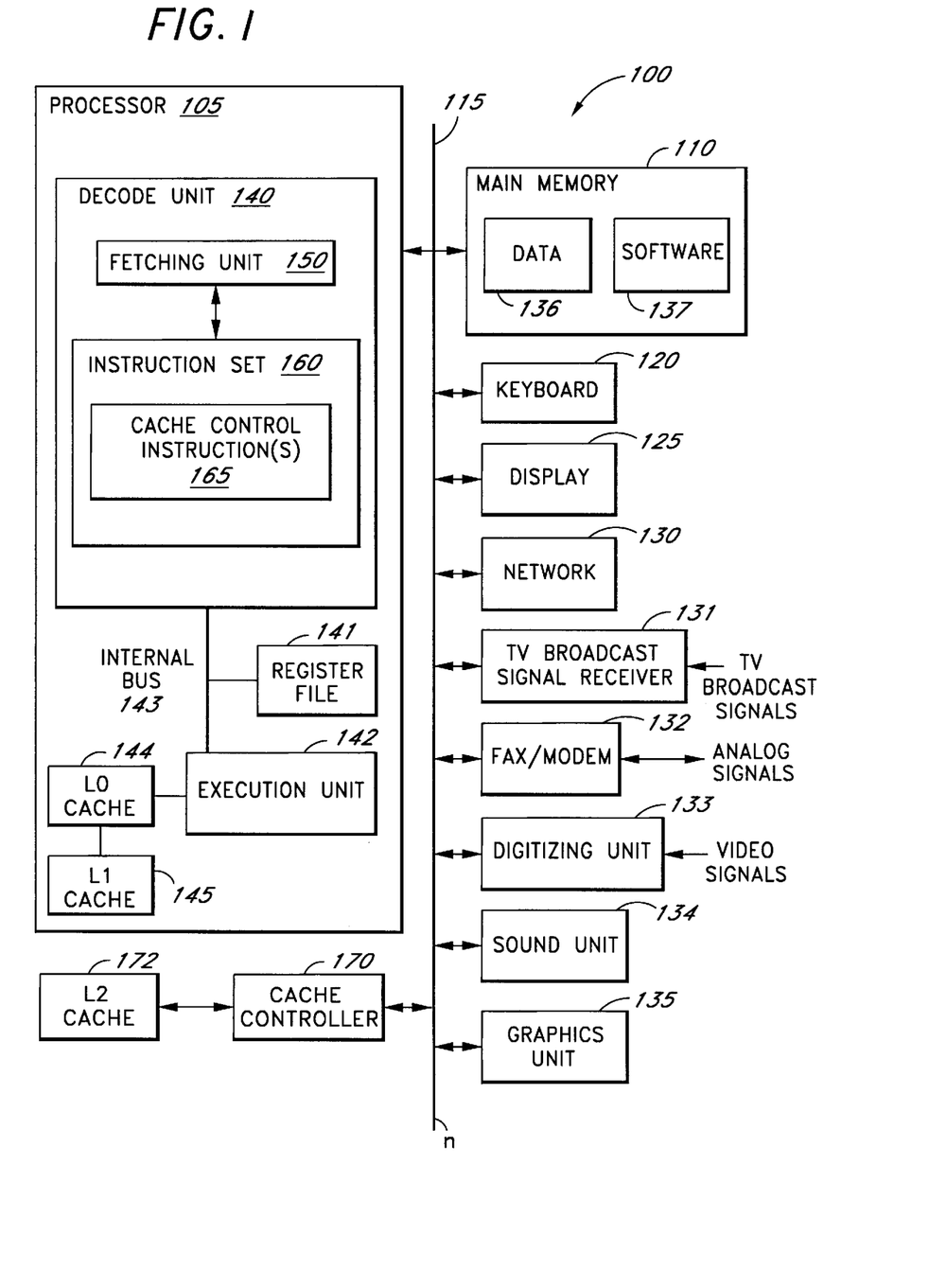
FIG. 1 illustrates an exemplary computer system in accordance with one embodiment of the invention.

FIG. 1 illustrates one embodiment of a computer system 100 which implements the principles of the present invention. Computer system 100 comprises a processor 105, a storage device 110, and a bus 115. The processor 105 is coupled to the storage device 110 by the bus 115. The storage device 110 represents one or more mechanisms for storing data. For example, the storage device 110 may include read only memory (ROM), random access memory (RAM), magnetic disk storage mediums, optical storage mediums, flash memory devices and/or other machine readable mediums. In addition, a number of user input/output devices, such as a keyboard 120 and a display 125, are also coupled to the bus 115. The processor 105 represents a central processing unit of any type of architecture, such as multi-threaded CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system.

In addition to other devices, one or more of a network 130, a TV broadcast signal receiver 131, a fax/modem 132, a digitizing unit 133, a sound unit 134, and a graphics unit 135 may optionally be coupled to bus 115. The network 130 and fax modem 132 represent one or more network connections for transmitting data over a machine readable media (e.g., carrier waves). The digitizing unit 133 represents one or more devices for digitizing images (i.e., a scanner, camera, etc.). The sound unit 134 represents one or more devices for inputting and/or outputting sound (e.g., microphones, speakers, magnetic main memories, etc.). The graphics unit 135 represents one or more devices for generating 3-D images (e.g., graphics card). FIG. 1 also illustrates that the storage device 110 has stored therein data 136 and software 137. Data 136 represents data stored in one or more of the formats described herein. Software 137 represents the necessary code for performing any and/or all of the techniques described with reference to FIGS. 2, and 4–6. Of course, the storage device 110 preferably contains additional software (not shown), which is not necessary to understanding the invention.

FIG. 1 additionally illustrates that the processor 105 includes decode unit 140, a set of registers 141, and execution unit 142, and an internal bus 143 for executing instructions. The processor 105 further includes two internal cache memories, a level 0 (L0) cache memory 144 which is coupled to the execution unit 142, and a level 1 (L1) cache memory 145, which is coupled to the L0 cache. An external cache memory, i.e., a level 2 (L2) cache memory 172, is coupled to bus 115 via a cache controller 170. The actual placement of the various cache memories is a design choice or may be dictated by the processor architecture. Thus, it is appreciated that the L1 cache 145 could be placed external to the processor 105. In alternate embodiments, more or less levels of cache (other than L1 and L2) may be implemented.

Of course, the processor 105 contains additional circuitry, which is not necessary to understanding the invention. The decode unit 140, registers 141 and execution unit 142 are coupled together by internal bus 143. The decode unit 140 is used for decoding instructions received by processor 105 into control signals and/or micro code entry points. In response to these control signals and/or micro code entry points, the execution unit 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 140 is shown including a fetching unit 150 which fetches instructions, and an instruction set 160 for performing operations on data. In one embodiment, the instruction set 160 includes a cache pollution avoidance instruction 165 provided in accordance with the present invention. Examples of the cache pollution avoidance instruction 165 includes the following instructions: a byte mask write instruction(s) (such as MASKMOVQ), a move 64 bits non temporal instruction(s) (such as MOVNTQ), and a move aligned four packed single-floating point (FP) non temporal instruction(s) (such as MOVNTPS). A byte mask instruction typically performs a write using a mask pattern. A mask pattern indicates the bit position at which a write can be performed. In one embodiment, a '0' corresponds to no write (mask) and a '1' corresponds to a write (unmask). Therefore, a mask pattern of 00100100 allows writing to the bit positions 2 and 5 while other bit positions are masked off. The MASKMOVQ and MOVNTQ instructions are applicable to integer data. In particular, the MASKMOVQ instruction moves 64-bits representing integer data from a register to the memory location specified and the MOVNTQ instruction moves 64-bits representing integer operands from a register to memory. The MOVNTPS instruction is applicable to packed floating point data, in which the results of an operation between two sets of numbers having a predetermined number of bits, are stored in a register having the same predetermined number of bits, i.e., the size or configuration of the operand is the same as that of the result register. While certain cache pollution accordance instruction, are described for use with particular type and amount of data, alternate embodiment, can support instructions that operate on different types and amounts of data.

In addition to the cache pollution avoidance instruction(s) 165, processor 105 can include new instructions and/or instructions similar to or the same as those found in existing general purpose processors. For example, in one embodiment the processor 105 supports an instruction set which is compatible with the Intel® Architecture instruction set used by existing processors, such as the Pentium®II processor. Alternative embodiments of the invention may contain more or less, as well as different instructions and still utilize the teachings of the invention.

The registers 141 represent a storage are on processor 105 for storing information, such as control/status information, scalar and/or packed integer data, floating point data, etc. It is understood that one aspect of the invention is the described instruction set. According to this aspect of the invention, the storage area used for storing the data is not critical. The term data processing system is used herein to refer to any machine for processing data, including the computer systems(s) described with reference to FIG. 1.

Figure 2:
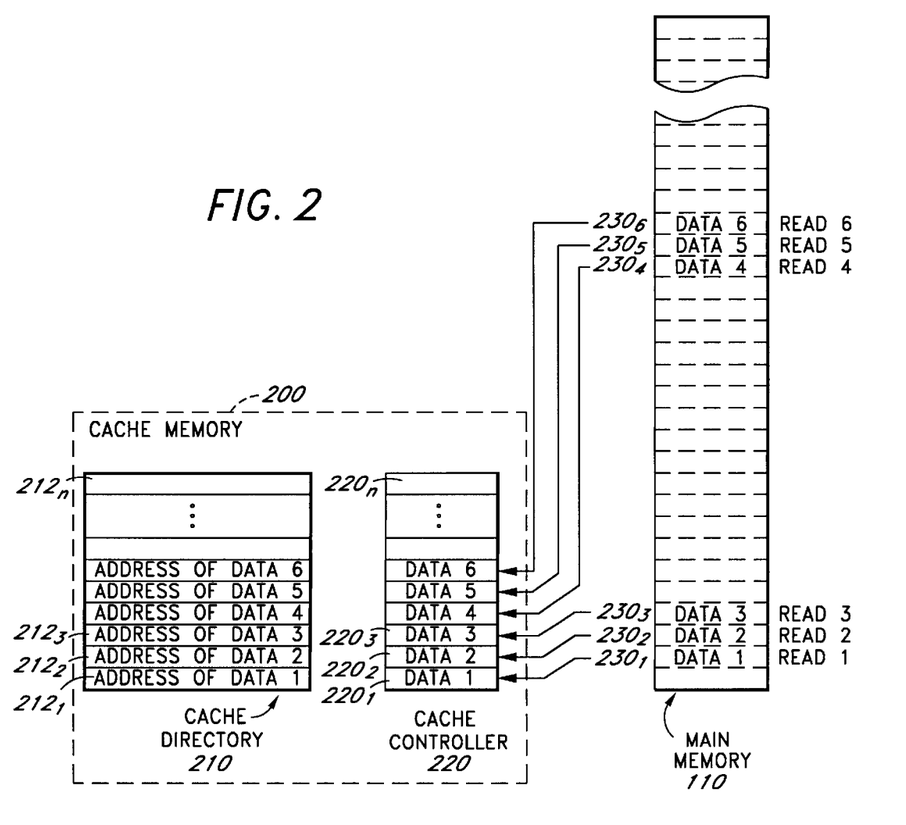
FIG. 2 illustrates one embodiment of the organizational structure of a cache memory e.g., L0, L1 and/or L2 according to one embodiment of the invention.

FIG. 2 illustrates one embodiment of the organizational structure of a cache memory e.g., L0, L1 and/or L2. For present discussion purposes, the cache memory L0, L1 and/or L2 will be referred to as cache memory 200. Cache memory 200 comprises a cache directory 210 and a plurality of cache entries $220_1$–$220_n$ (collectively referred to as cache entries 220). The cache directory 210 stores a plurality of addresses $212_1$–$212_n$ of the memory locations in storage device 110, corresponding to the cache entries $220_1$–$220_n$. These memory locations in storage device 110 have addresses $230_1$–$230_n$.

Figure 3:
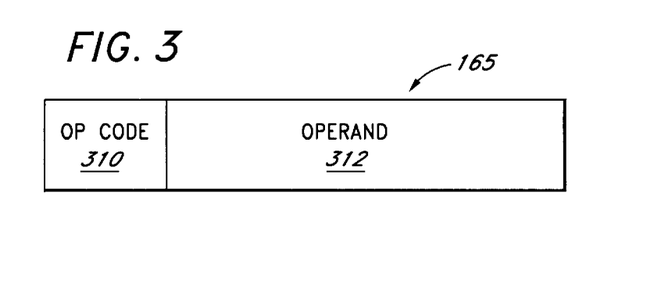
FIG. 3 illustrates one embodiment of the format of the cache pollution avoidance instruction 165 provided according to one embodiment of the invention.

FIG. 3 illustrates one embodiment of the format of the cache pollution avoidance instruction 165 provided in accordance with the present invention. The cache pollution avoidance instruction 165 comprises an operational code (OP CODE) 310 which identifies the operation of the cache pollution avoidance instruction 165 and an operand 312 which specifies the address of the data object that the instruction 165 will be operating on. In order to understand the present invention, certain terminology must be understood in reference to the cache pollution avoidance technique. The present invention operates within the framework wherein the particular data being accessed will have (or not have) temporal locality. Temporal locality is an attribute associated with data and determined by how soon in the future a program will access the data. Thus, for each data pattern, the data may have temporal locality (T) or not have temporal locality (NT) with respect to a cache memory or a cache level in the cache hierarchy.

In FIG. 1, three levels of cache hierarchy are shown (representing levels L0, L1 and L2), wherein at each level there are two possibilities for classifying the data pattern being accessed. The classifications are noted as 1) temporal (T); and 2) non-temporal (NT). The classifications are based on the attributes associated with the data access for a computer system. It is appreciated that three levels of cache hierarchy are shown in FIG. 1, but there could be more or less cache levels. For example, the present invention could be practiced where there is only one cache level (L0 only) or where there are only two cache levels (L0 and L1), or where there are four or more cache levels.

In the practice of the invention, the temporal property is associated with how close to the processor 105 the data is stored or saved. Accordingly, the temporal property is associated with the use or re-use of data at a given level. For example, if a particular data pattern in the program is identified to be T with respect to L1, but NT with respect to L2, then this data will be used in the near future in the L1 cache, but not so near in the future in the L2 cache. The temporal distance of how soon the data will be used or re-used is application dependent for a particular computer system and software. When data access is regarded as T at a given cache level, it will likely be reused (assuming no branches taken, etc.) within a certain time frame (for example, within x number of instructions) in the near future. Where data access is regarded as NT at a given level, it will likely not be re-used within the specified time frame.

Thus, the noted temporal criteria can be set based on the action required of the data. Subsequently, the present invention provides for a scheme in which cache pollution avoidance can be implemented at the cache memory or at each cache hierarchy level depending on the attributes associated with the data at a particular level. In particular, by using the cache pollution avoidance instruction 165 to process data, the programmer is indicating that the associated data does not have temporal locality, i.e., the associated data is non-temporal. The associated data is then processed according to the cache pollution avoidance instruction 165 used. Thus, cache pollution avoidance can be based on none, one, or more than one, of the categories available at each of the cache levels.

In FIG. 1, only L0, L1 and L2 levels are shown, but it is appreciated that more or less levels (e.g., one level) can be readily implemented. The embodiment shown in FIGS. 4–6 describes the use of the invention with respect to one cache level.

The cache pollution avoidance technique of the invention will now be described. Upon receiving the cache pollution avoidance instruction 165, the cache directory 210 of cache memory 200 is first polled to determine if the address specified in the operand 312 matches one of the addresses stored in the cache directory 210. If so, there is a cache hit, and the corresponding data object (i.e., contents of the cache memory corresponding to the addresses specified in the operand) is updated. In one embodiment where different levels of cache memories are used, for example, L0, L1, L2, any one cache level or any combination of the cache memories are updated. In an alternate embodiment, both the corresponding data object in cache memory and in main memory are updated.

If the address specified in the operand 312 does not match any of the addresses stored in the cache directory 210, there is a cache miss. In this case, there is no cache line fill, i.e., the corresponding data object in storage device 110 will not be transferred into the cache memory 210. By not performing the cache line fill, the processor 105 avoids polluting the cache.

Figure 4A:
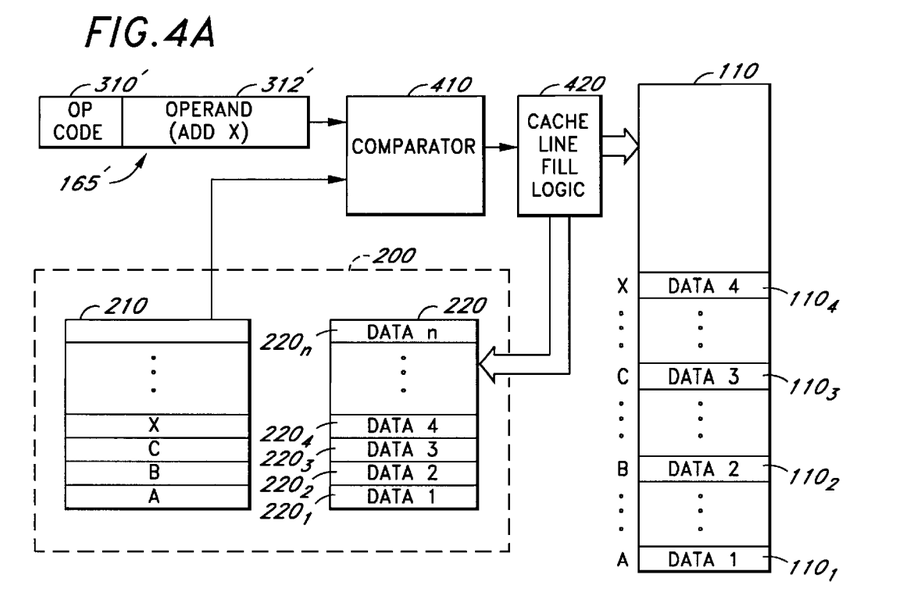
FIGS. 4A and 4B illustrate the operation of the cache pollution avoidance instruction according to one embodiment of the invention.
Figure 4B:
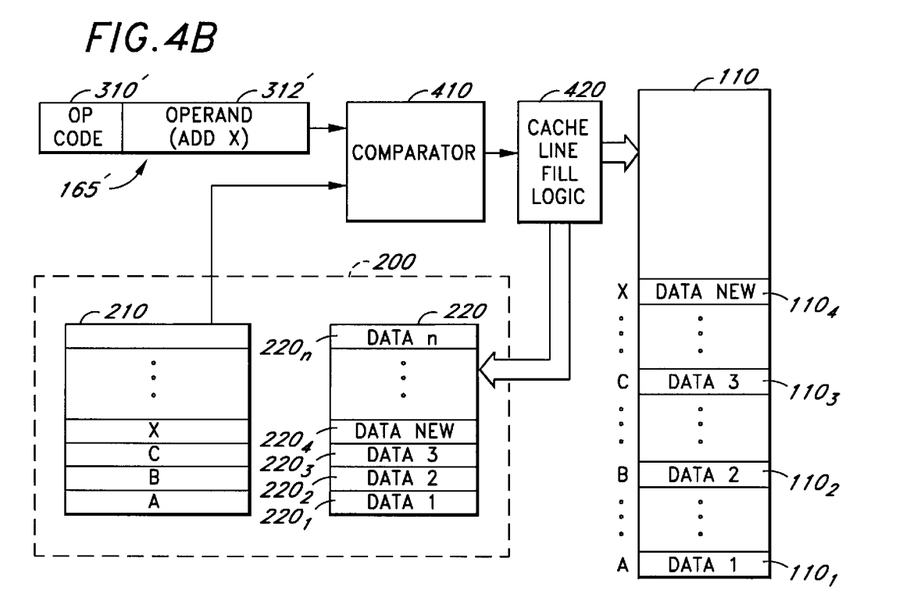

FIGS. 4A and 4B illustrate the operation of the cache pollution avoidance instruction according to one embodiment of the invention, in which there is a cache hit. Upon receiving the cache pollution avoidance instruction 165', the cache directory 210 of cache memory 200 is polled to determine if the address, e.g., address X, specified in the operand 312' matches one of the address stored in the cache directory 210. If the cache memory 200 is an internal cache memory, i.e., a L0 or L1 cache memory, the processor 105 conducts the polling. If the cache memory 200 is an external cache memory, e.g., L2 cache memory, polling is conducted by the cache controller. In one embodiment, a comparator 410 compares the address X specified in the operand 312' to determine if it matches one of the addresses $212_1-212_n$ stored in cache directory 210 (FIG. 4A). In the present case, there is an address match, indicating that there is a cache hit, and the comparator 400 issues a first signal to the cache line fill logic 420, which determines if a signal should be sent to either the data object $220_4$ corresponding to the address X in cache directory 210 or to both the data object $220_4$ and to the corresponding data object in $110_4$ in storage device 110 to update the data object $220_4$ and/or $110_4$. The required signal(s) are then issued and updating of the corresponding data object $220_4$ and/or $110_4$ is performed (FIG. 4B).

Figure 5A:
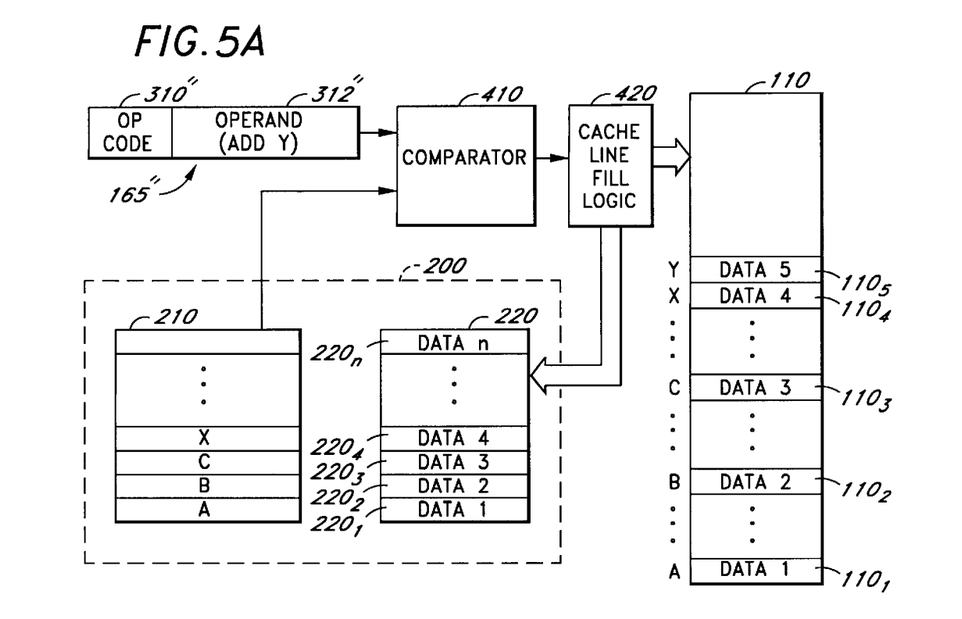
FIGS. 5A and 5B illustrate the operation of the cache pollution avoidance instruction according to an alternate embodiment of the invention.
Figure 5B:
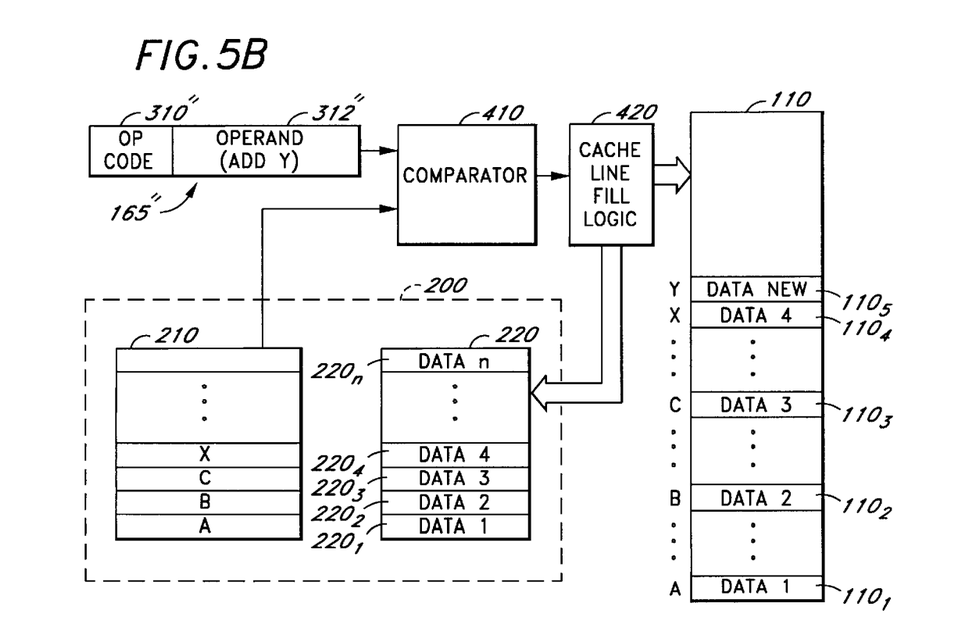

FIGS. 5A and 5B illustrate the operation of the cache pollution avoidance instruction according to an alternate embodiment of the invention in which there is cache miss. Upon receiving the cache pollution avoidance instruction 165", the cache directory 210 of cache memory 200 is polled to determine if the address, e.g., address Y, specified in the operand 312" matches one of the address stored in the cache directory 210. In particular, the comparator 410 compares the address Y specified in the operand 312" to determine if it matches one of the addresses $212_1-212_n$ stored in cache directory 210 (FIG. 5A). In this case, the address Y specified in the operand 312" does not match any one of the addresses $212_1-212_n$ stored in the cache directory 210. As a result, the comparator 410 issues a second signal to the cache line fill logic 420, indicating that there is a cache miss. In response, the cache line fill logic issues only a signal to the storage device 110 to update the contents of address Y. However, a cache line fill is not performed, i.e., the corresponding data object $110_5$ in storage device 110 will not be transferred into the cache memory 210. The cache memory 210 therefore remains intact and is not polluted by the non-temporal data.

In one embodiment, the cache pollution avoidance instruction 165 is a weakly ordered instruction. That is, when processing a plurality of the cache pollution avoidance instructions 165, the execution of the plurality of cache pollution avoidance instructions are not performed in the same order as they are fetched by the fetching unit in the decoder. In an alternate embodiment, the cache pollution avoidance instruction 165 has the property of write collapsing, whereby when executing successive stores to the same address, only the last store will be visible on the bus 115. In a further alternate embodiment, the cache pollution avoidance instruction 165 has the property of write combining, where cacheable store misses to the same cache line are combined before the write is issued to storage device 110.

Figure 6:
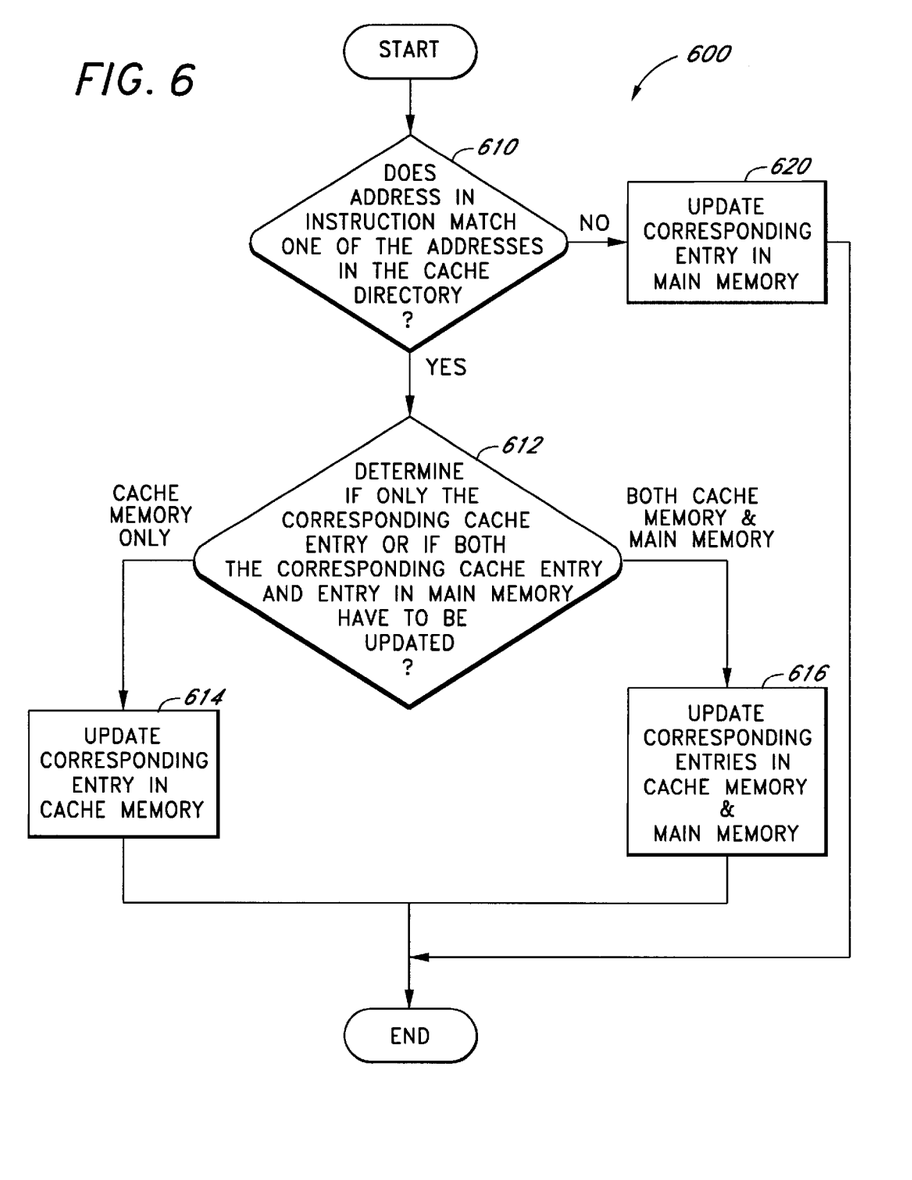
FIG. 6 is a flowchart illustrating one embodiment of the process of the present invention.

FIG. 6 is a flowchart illustrating one embodiment of the process of the present invention. Beginning from a start state, the process 600 proceeds to a decision block 610, where it determines if the address in the cache pollution avoidance instruction 165 matches one of the addresses in the cache directory 210. If so, the process 600 advances to decision block 612, where it determines if only the corresponding cache entry is to be updated or if both the corresponding cache entry and the corresponding entry in storage device 110 have to be updated. If only the corresponding cache entry is to be updated, the process 600 proceeds to process block 614, where it updates the corresponding entry in cache memory (block 614). Otherwise, it updates both the corresponding cache entry and the corresponding entry in storage device 110. In either case, the process 600 proceeds to process block 618, where the process terminates. If it is determined, at decision block 610, that the address in the cache pollution avoidance instruction 165 does not match one of the addresses in the cache directory 210, the process S600 does not perform a cache line fill, and instead, only updates the corresponding entry in storage device 110 (process block 620).

The use of the present invention thus enhances system performance by not performing a cache line fill during non-temporal accesses. In particular, since no cache line fill is performed during non-temporal access, system performance is improved by reducing contention for the cache, as frequently used data (i.e., temporal data) is not evicted from the cache by non-temporal data. As a result, cache pollution or disturbance during non-temporal accesses is minimized.

While a preferred embodiment has been described, it is to understood that the invention is not limited to such use. In addition, while the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A computer system for comprising:
   a main memory having a plurality of main memory addresses each having a corresponding data entry;
   a processor coupled to said main memory; and
   at least one cache memory coupled to said processor, said at least one cache memory having a cache directory with a plurality of addresses and a cache controller having a plurality of data entries corresponding to said plurality of addresses, each data entries having a non-temporal locality, said processor receiving a non-temporal instruction having an operand address, said processor determining if said operand address matches one of said plurality of addresses in said cache directory, if so, said processor updating a cache entry in said cache controller corresponding to said matched address, otherwise updating a memory entry corresponding to said operand address in said main memory and not performing a cache fill.

2. The computer system of claim 1, wherein said processor further updates a memory entry in said main memory if said operand address matches one of said plurality of addresses in said cache directory.

3. The computer system of claim 1, wherein said non-temporal instruction performs operations on non-temporal data.

4. The computer system of claim 1, wherein said non-temporal instruction performs operations on floating point data.

5. The computer system of claim 1, wherein said non-temporal instruction performs operations on integer data.

6. The computer system of claim 1, further comprising a comparator coupled to said processor, said comparator comparing the operand address with said plurality of addresses in said cache directory and providing an output signal indicative of a status of the comparison operation.

7. The computer system of claim 6, further comprising a cache line fill logic circuit coupled to said comparator and to said processor, said cache line fill logic generating an output signal to one of said at least one cache memory and said main memory to update a corresponding data entry in one of said at least one cache memory and said main memory, in response to a command from said processor when said comparator determines that the operand address matches one of said plurality of addresses in said cache directory.

8. The computer system of claim 6, further comprising a cache line fill logic circuit coupled to said comparator and to said processor, said cache line fill logic generating an output signal to said at least one cache memory and said main memory to update a corresponding data entry in said at least one cache memory and said main memory, in response to a command from said processor when said comparator determines that the operand address matches one of said plurality of addresses in said cache directory.

9. The computer system of claim 6, further comprising a cache line fill logic circuit coupled to said comparator and to said processor, said cache line fill logic generating an output signal to said main memory to update a corresponding data entry in said main memory, in response to a command from said processor when said comparator determines that the operand address does not match one of said plurality of addresses in said cache directory.

10. A method comprising:
    receiving a non-temporal instruction having an operand address;
    determining if said operand address matches one of a plurality of addresses in a cache directory; and
    updating a cache entry in a cache controller corresponding to said matched address if said operand address matches one of said plurality of addresses in said cache directory, otherwise updating a memory entry corresponding to said operand address in a main memory and not performing a cache fill, each cache entry having a non-temporal locality.

11. The method of claim 10, further comprising updating a memory entry in said main memory if said operand address matches one of said plurality of addresses in said cache directory.

12. The method of claim 10, wherein said non-temporal instruction performs operations on non-temporal data.

13. The method of claim 10, wherein said non-temporal instruction performs operations on floating point data.

14. The method of claim 10, wherein said non-temporal instruction performs operations on integer data.

15. The method of claim 10, further comprising:

comparing the operand address with said plurality of addresses in said cache directory, and providing an output signal indicative of a status of the comparison operation.

16. The method of claim 15, further comprising:

generating an output signal to one of said cache controller and said main memory to update a corresponding data entry in one of said cache controller and said main memory, if the operand address matches one of said plurality of addresses in said cache directory.

17. The method of claim 15, further comprising:

generating an output signal to said cache controller and said main memory to update a corresponding data entry in said cache controller and said main memory, in response to a command from said processor if the operand address matches one of said plurality of addresses in said cache directory.

18. The method of claim 15, further comprising:

generating an output signal to said main memory to update a corresponding data entry in said main memory, if the operand address does not match one of said plurality of addresses in said cache directory.

* * * * *